US005709085A

United States Patent [19]

Herbig

[11] Patent Number: 5,709,085

[45] Date of Patent: Jan. 20, 1998

[54] METHOD OF COOLING THE HYDRAULIC FLUID IN THE WORKING CIRCUIT OF A CONSTRUCTION MACHINE, IN PARTICULAR A HYDRAULIC EXCAVATOR

[75] Inventor: Rainer Herbig, Dortmund, Germany

[73] Assignee: O & K Orenstein & Koppel AG, Berlin, Germany

[21] Appl. No.: 648,053

[22] PCT Filed: Nov. 19, 1993

[86] PCT No.: PCT/EP93/03235

§ 371 Date: May 17, 1996

§ 102(e) Date: May 17, 1996

[87] PCT Pub. No.: WO95/14175

PCT Pub. Date: May 26, 1995

[51] Int. Cl.[6] .......... F16D 31/02

[52] U.S. Cl. .......... 60/456

[58] Field of Search .......... 60/456

[56] References Cited

U.S. PATENT DOCUMENTS

| | | | |
|---|---|---|---|
| 3,222,865 | 12/1965 | Miller | 60/456 |
| 3,960,174 | 6/1976 | Latimer et al. . | |
| 3,976,124 | 8/1976 | Brown | 60/456 |
| 4,220,015 | 9/1980 | Johansing, Jr. . | |
| 5,109,672 | 5/1992 | Chenoweth et al. | 60/456 |
| 5,317,872 | 6/1994 | Ingvast | 60/456 |

FOREIGN PATENT DOCUMENTS

| | | |
|---|---|---|
| 42 32 542 | 1/1994 | Germany . |
| 1396778 | 6/1975 | United Kingdom . |

*Primary Examiner*—F. Daniel Lopez

*Attorney, Agent, or Firm*—Spencer & Frank

[57] ABSTRACT

A method for cooling hydraulic oil present in an operating circuit of a construction machine, and an installation for cooling hydraulic oil according to the method. The method includes the steps of guiding the hydraulic oil at least partially over an oil cooler and thereafter causing the hydraulic oil to flow into a hydraulic oil tank. The hydraulic oil returning from operating areas of the operating circuit is stored intermediately and has an elevated temperature, the storage occurring in an intermediate reservoir spatially separate from the hydraulic oil present in the hydraulic oil tank prior to causing the hydraulic oil to flow into the hydraulic oil tank. The hydraulic oil is pumped from the intermediate reservoir to the oil cooler for lowering the temperature of the hydraulic oil prior to causing the hydraulic oil to flow into the hydraulic oil tank. The hydraulic oil is then caused to flow into the hydraulic oil tank from the oil cooler for mixing the hydraulic oil flowing into the hydraulic oil tank from the oil cooler with the hydraulic oil present in the hydraulic oil tank. The hydraulic oil flowing into the hydraulic oil tank from the oil cooler has a temperature different from the temperature of the hydraulic oil present in the hydraulic oil tank.

8 Claims, 1 Drawing Sheet

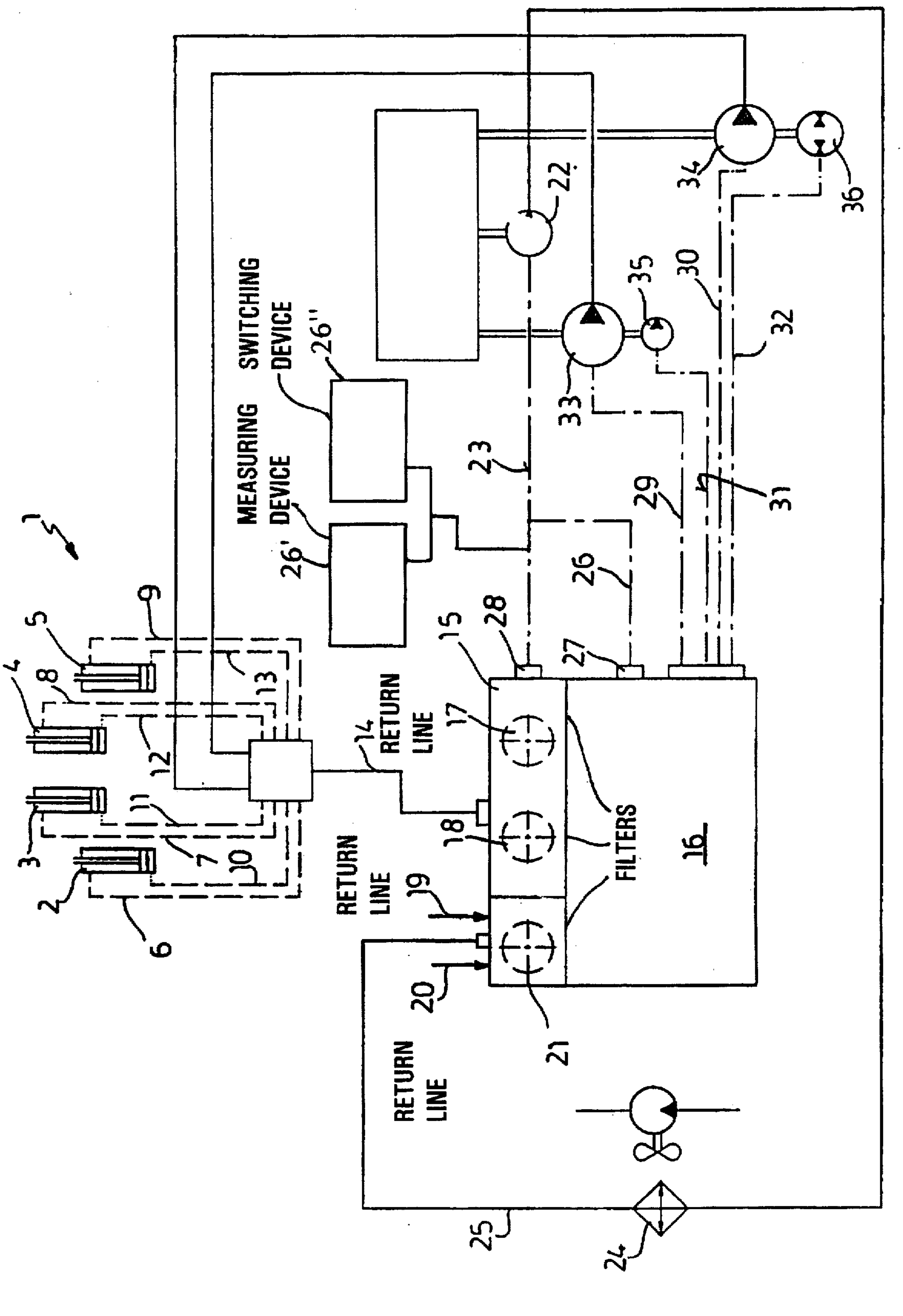
SWITCHING DEVICE
26''
MEASURING DEVICE
26'
RETURN LINE
14
RETURN LINE
19
RETURN LINE
FILTERS
16
1
2
3
4
5
6
7
8
9
10
11
12
13
15
17
18
20
21
22
23
24
25
26
27
28
29
30
31
32
33
34
35
36

METHOD OF COOLING THE HYDRAULIC FLUID IN THE WORKING CIRCUIT OF A CONSTRUCTION MACHINE, IN PARTICULAR A HYDRAULIC EXCAVATOR

FIELD OF INVENTION

The invention relates to a method for cooling the hydraulic oil present in the operating circuit of a construction machine, in particular a hydraulic excavator, in that the hydraulic oil is guided at least partially over an oil cooler and thereafter flows into a hydraulic oil tank.

BACKGROUND OF THE INVENTION

At present two methods are used for cooling the hydraulic oil in construction machines, in particular hydraulic excavators.

According to one method, all partial flows flow into a central tank, in which subsequently an appropriate mixing temperature ensues. A partial amount of this hydraulic oil is aspirated by a pump and guided over an oil cooler, which cooperates with a blower motor, before it cause the oil to flow back into the tank. To assure an appropriate operating temperature of the hydraulic oil in the tank, it is necessary either to aspirate a large amount of oil out of it or the oil cooler must be embodied to be of an appropriate size.

According to another method defined partial flows are directly led to the collecting tank and the heated oil from the hydraulic operating system (operating cylinders) is supplied to an oil cooler before reaching the collecting tank. The advantages of the above are that for thermodynamic reasons, the hottest part of the oil is provided to the cooler part, since in this way a higher cooling output can be achieved. Disadvantages are based on the fact that hydraulic operating system (operating cylinders) of the construction machine is not continuously operated and, therefore the temperature in the collecting tank may attain critical values.

It is an object of the invention to achieve an optimization of the degree of efficiency at the hydraulic oil cooler in order to assure in every case that the temperature present in the collecting tank cannot attain critical values. Further more, it is another object of the invention to reduce the cooling surface of the oil cooler.

SUMMARY OF THE INVENTION

The above objects are attained in accordance with the invention in that the hydraulic oil returning from the operating area(s), in particular the operating cylinders, having a very high temperature, is intermediately stored prior to entering the hydraulic oil tank, i.e. that it is spatially separated from the oil in the hydraulic oil tank, and is aspirated from there via a pump which sends the hydraulic oil which is at a high temperature level to the oil cooler before it flows back into the hydraulic oil tank at an appropriately lower temperature and is mixed there with the hydraulic oil of a different temperature level which is present there.

The pump preferably aspirates hydraulic oil from the hydraulic oil tank, if needed through a bypass, as soon as the amount of oil present in the intermediate reservoir falls below a preset filling amount or a preset filling level. The aspiration of secondary air is prevented by this step. In the same way the pump can automatically aspirate the hotter hydraulic oil from the intermediate reservoir when the filling amount or the filling level are exceeded.

A device for cooling the hydraulic oil present in the operating circuit of a construction machine is distinguished in that a further container in the form of an intermediate reservoir is provided in the area of the hydraulic oil tank, wherein the container in accordance with a further concept of the invention constitutes a partial area of the hydraulic oil tank. Accordingly, separate components which require structural space become superfluous, particularly since the total oil amount is not changed and instead is merely provided at different places of the hydraulic oil tank. The hot hydraulic oil provided in the intermediate reservoir is supplied to the oil cooler via a separate aspirating pump designed as a cooling oil pump, wherein this aspirating pump automatically aspirates oil from the hydraulic oil tank when there is too low a filling amount or filling level in the intermediate reservoir.

If a separate bypass line is used, at least one measuring device is preferably provided in the area of the intermediate reservoir, which cooperates with an appropriate switching device for redirecting the oil flows from the intermediate reservoir or the hydraulic oil tank.

If, however, no bypass line is to be used, the container disposed in the hydraulic oil tank, which projects into the hydraulic oil tank, can be provided at its bottom with at least one opening to the space inside the hydraulic oil tank, through which the aspirating pump can aspirate cooler oil from the hydraulic oil tank in case of too low a proportion of hot oil in the intermediate reservoir. In this way it is possible in a simple manner to prevent the aspiration of secondary air or the creation of a vacuum in the intermediate reservoir.

By means of the method according to the invention, the inlet temperature difference of the oil cooler can be greater by approximately 10° K. than it was possible to achieve by the conventional steps. As a result the cooling surface, depending on the type of the machine, can be reduced by up to 40%, which results in not insignificant savings in cost because of reduced coolers and a single aspirating installation.

BRIEF DESCRIPTION OF THE DRAWING

The invention is represented in the drawings by an exemplary embodiment.

The single drawing FIGURE shows the method and subject characteristics of the invention in a top view in the form of a basic diagram.

DETAILED DESCRIPTION OF THE INVENTION

A partial area of the hydraulic operating system 1 is represented, which in this example is constituted by several operating cylinders 2, 3, 4, 5. The hydraulic oil is brought via supply lines 6, 7, 8, 9, which are only suggested, into the area of the operating cylinders 2, 3, 4, 5, and is removed again via return lines 10, 11, 12, 13. The return lines 10, 11, 12, 13 are combined into a collecting or return line 14 and are brought to a container 15 designed as an intermediate reservoir, which dips into the oil which is present—which cannot be seen in this top view—in the hydraulic oil tank 16. The intermediate reservoir 15 constitutes a partial area of a central hydraulic oil tank 16 and is equipped with elongated filter cartridges 17, 18. Additional return lines from other areas of the hydraulic system (not further represented) are indicated by lines 19 and 20 which, however, do not supply the respectively flowing hydraulic oil to the intermediate reservoir 15, but directly via further filter element 21 to the sump of the hydraulic oil tank 16. The hydraulic oil from the hydraulic operating system 1 flowing into the intermediate reservoir 15 is aspirated by means of a cooling oil pump 23 through the line 23 and sent to a downstream-connected oil cooler 24. The oil which is cooled here is now forwarded through a further line 25 through the filters 21 into the sump of the hydraulic oil tank 16. To the extent that the predetermined filling level of the hot hydraulic oil in the intermediate reservoir 15 has not been negatively exceeded, the cooling oil pump 22 continuously aspirates oil from the intermediate reservoir 15 in accordance with its conveying output and provides it via the cooler 24 to the sump of the hydraulic oil tank 16. To the extent that the predetermined filling level was negatively exceeded because of the continuous operation of the hydraulic operating system or when starting the construction machine, oil is aspirated, for example, directly from the sump of the hydraulic oil tank through openings (not shown) provided in the lower region of the intermediate reservoir 15. The cooling oil pump 22 therefore does not aspirate any secondary air and can be continuously supplied with oil.

Alternatively there is the option to measure the filling level in the intermediate reservoir 15 via a bypass line 26 and a measuring device 26', and to automatically cause a switch by means of switching device 26" to a tap point 27 at the hydraulic oil tank 16, wherein the aspirating point 28 at the intermediate reservoir is temporarily closed long enough until the filling level in the intermediate reservoir 15 has again reached its predetermined value.

Furthermore, aspirating lines 29, 30, 31, 32 can also be seen in the drawing figure which lead on the one side to main operating pumps 33, 34 and on the other side to a pilot pump 35 and a swivel pump 36 which in turn cooperate with users, not shown.

What I claim is:

1. A method for cooling hydraulic oil present in an operating circuit of a construction machine comprising the steps of:

intermediately storing only a portion of the hydraulic oil returning from operating areas of the operating circuit and having an elevated temperature in an intermediate reservoir spatially separate from the hydraulic oil present in a hydraulic oil tank prior to causing the hydraulic oil to flow into the hydraulic oil tank;

pumping the hydraulic oil having an elevated temperature from the intermediate reservoir to an oil cooler for lowering a temperature of the hydraulic oil prior to causing the hydraulic oil to flow into the hydraulic oil tank;

causing the hydraulic oil to flow into the hydraulic oil tank from the oil cooler for mixing the hydraulic oil flowing into the hydraulic oil tank from the oil cooler with the hydraulic oil present in the hydraulic oil tank, the hydraulic oil flowing into the hydraulic oil tank from the oil cooler having a temperature different from the temperature of the hydraulic oil present in the hydraulic oil tank; and pumping hydraulic oil from the hydraulic oil tank as soon as the hydraulic oil in the intermediate reservoir falls below a predetermined filling level.

2. The method according to claim 1, wherein the construction machine is a hydraulic excavator.

3. The method according to the claim 1, wherein the operating areas comprise operating cylinders.

4. The method according to claim 1, wherein the step of pumping includes the step of pumping the hydraulic oil from the intermediate reservoir to the oil cooler as soon as the hydraulic oil in the intermediate reservoir exceeds a predetermined filling level.

5. An installation for cooling hydraulic oil present in an operating circuit of a construction machine according to the method of claim 1, comprising an oil cooler and a hydraulic oil tank in flow communication with the oil cooler, wherein the improvement comprises an intermediate reservoir in flow communication with both the hydraulic oil tank and the oil cooler, the intermediate reservoir constituting a partial area of the hydraulic oil tank.

6. The installation according to claim 5, further comprising a pump structurally separate from and in flow communication with the oil cooler, the hydraulic oil tank, and the intermediate reservoir, the pump being effective for pumping hydraulic oil from the intermediate reservoir to the oil cooler and for pumping hydraulic oil from the hydraulic oil tank.

7. The installation according to claim 5, further comprising:

a first aspirating line leading from the intermediate reservoir to the pump; and a second aspirating line leading from the hydraulic oil tank to the first aspirating line.

8. An installation for cooling hydraulic oil present in an operating circuit of a construction machine according to the method of claim 1, comprising an oil cooler and a hydraulic oil tank in flow communication with the oil cooler, wherein the improvement comprises:

an intermediate reservoir in flow communication with both the hydraulic oil tank and the oil cooler;

at least one measuring device operatively associated with the intermediate reservoir; and a switching device operatively associated with the at least one measuring device for cooperating with the measuring device for redirecting a flow of hydraulic oil from the intermediate reservoir or the hydraulic oil tank.

* * * * *